United States Patent
Mitchell

(10) Patent No.: US 8,276,439 B2
(45) Date of Patent: Oct. 2, 2012

(54) SYSTEM AND METHOD FOR DETERMINING A VOLUME OF A TORQUE CONVERTER CLUTCH AND CALIBRATING A TRANSMISSION

(75) Inventor: Andrew L. Mitchell, Indianapolis, IN (US)

(73) Assignee: GM Global Technology Operations LLC

( * ) Notice: Subject to any disclaimer, the term of this patent is extended or adjusted under 35 U.S.C. 154(b) by 236 days.

(21) Appl. No.: 12/779,392

(22) Filed: May 13, 2010

(65) Prior Publication Data

US 2011/0277533 A1 Nov. 17, 2011

(51) Int. Cl.
G01M 15/02 (2006.01)
F16D 25/10 (2006.01)
(52) U.S. Cl. ............. 73/115.01; 73/115.02; 192/30 R; 192/31; 477/52; 477/53
(58) Field of Classification Search .. 73/115.01–115.04; 192/30 R, 31; 477/52, 53, 174, 176
See application file for complete search history.

(56) References Cited

U.S. PATENT DOCUMENTS

| | | | | |
|---|---|---|---|---|
| 4,070,927 A | * | 1/1978 | Polak | 475/286 |
| 5,072,390 A | * | 12/1991 | Lentz et al. | 701/60 |
| 5,115,698 A | * | 5/1992 | Leising et al. | 475/65 |
| 5,693,878 A | * | 12/1997 | Giles | 73/115.02 |
| 5,803,869 A | * | 9/1998 | Jamzadeh et al. | 477/168 |
| 6,253,140 B1 | * | 6/2001 | Jain et al. | 701/67 |
| 6,285,942 B1 | * | 9/2001 | Steinmetz et al. | 701/67 |
| 6,319,172 B1 | * | 11/2001 | Steinmetz et al. | 477/143 |
| 6,480,797 B1 | * | 11/2002 | Fritz et al. | 702/107 |
| 7,069,767 B2 | * | 7/2006 | Runde et al. | 73/1.71 |
| 8,050,833 B2 | * | 11/2011 | Runde et al. | 701/59 |
| 2005/0049772 A1 | * | 3/2005 | Liu | 701/54 |
| 2005/0257632 A1 | * | 11/2005 | Runde et al. | 73/865.9 |
| 2006/0224291 A1 | * | 10/2006 | Geist et al. | 701/51 |
| 2007/0219698 A1 | * | 9/2007 | McDonald et al. | 701/65 |
| 2008/0058161 A1 | * | 3/2008 | Sieffert et al. | 477/176 |
| 2008/0194384 A1 | * | 8/2008 | League et al. | 477/130 |
| 2008/0228340 A1 | * | 9/2008 | Rains et al. | 701/29 |
| 2009/0192684 A1 | * | 7/2009 | Cullen et al. | 701/54 |
| 2009/0197736 A1 | * | 8/2009 | Wright et al. | 477/70 |
| 2009/0227422 A1 | * | 9/2009 | Fayyad et al. | 477/176 |

* cited by examiner

Primary Examiner — David Rogers

(57) ABSTRACT

A system for calibrating a transmission includes a slip generation module, a volume determination module, and a calibration control module. The slip generation module generates transmission slip. The volume determination module, after the transmission slip has been generated, applies a torque converter clutch (TCC) and determines a volume of the TCC based on a period for the TCC to fill with hydraulic fluid. The calibration control module generates a calibrated volume based on the determined volume and calibrates a control module based on the calibrated volume, wherein the control module controls the transmission.

20 Claims, 6 Drawing Sheets

SYSTEM AND METHOD FOR DETERMINING A VOLUME OF A TORQUE CONVERTER CLUTCH AND CALIBRATING A TRANSMISSION

FIELD

The present disclosure relates to transmission control systems, and more particularly to a system and method for determining a volume of a torque converter clutch (TCC) and calibrating a transmission.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

Internal combustion engines combust an air/fuel (A/F) mixture within cylinders to drive pistons that rotatably turn a crankshaft generating drive torque. The drive torque may be transferred from the crankshaft to a driveline (e.g., wheels) of a vehicle via a transmission. More specifically, the transmission may translate (i.e., multiply) the drive torque on the crankshaft to drive torque at the wheels of the vehicle. A torque converter (e.g., a fluid coupling) may selectively couple the transmission to the crankshaft.

The torque converter may also include a torque converter clutch (TCC). For example, the TCC may be referred to as a "lock-up clutch." In other words, the TCC may be selectively engaged to link the crankshaft with an input shaft of the transmission. The TCC may be controlled in any suitable manner. Specifically, application of the TCC may be controlled by applying a fluid or mechanical pressure to the TCC. For example, a level of engagement of the TCC may be controlled based on an amount of hydraulic fluid in the TCC.

SUMMARY

A system for calibrating a transmission includes a slip generation module, a volume determination module, and a calibration control module. The slip generation module generates transmission slip. The volume determination module, after the transmission slip has been generated, applies a torque converter clutch (TCC) and determines a volume of the TCC based on a period for the TCC to fill with hydraulic fluid. The calibration control module generates a calibrated volume based on the determined volume and calibrates a control module based on the calibrated volume, wherein the control module controls the transmission.

A method for calibrating a transmission includes generating transmission slip, after the transmission slip has been generated, applying a torque converter clutch (TCC) and determining a volume of the TCC based on a period for the TCC to fill with hydraulic fluid, generating a calibrated volume based on the determined volume, and calibrating a control module based on the calibrated volume, wherein the control module controls the transmission.

In still other features, the systems and methods described above are implemented by a computer program executed by one or more processors. The computer program can reside on a tangible computer readable medium such as but not limited to memory, nonvolatile data storage, and/or other suitable tangible storage mediums.

Further areas of applicability of the present disclosure will become apparent from the detailed description provided hereinafter. It should be understood that the detailed description and specific examples are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION

Figure 1:
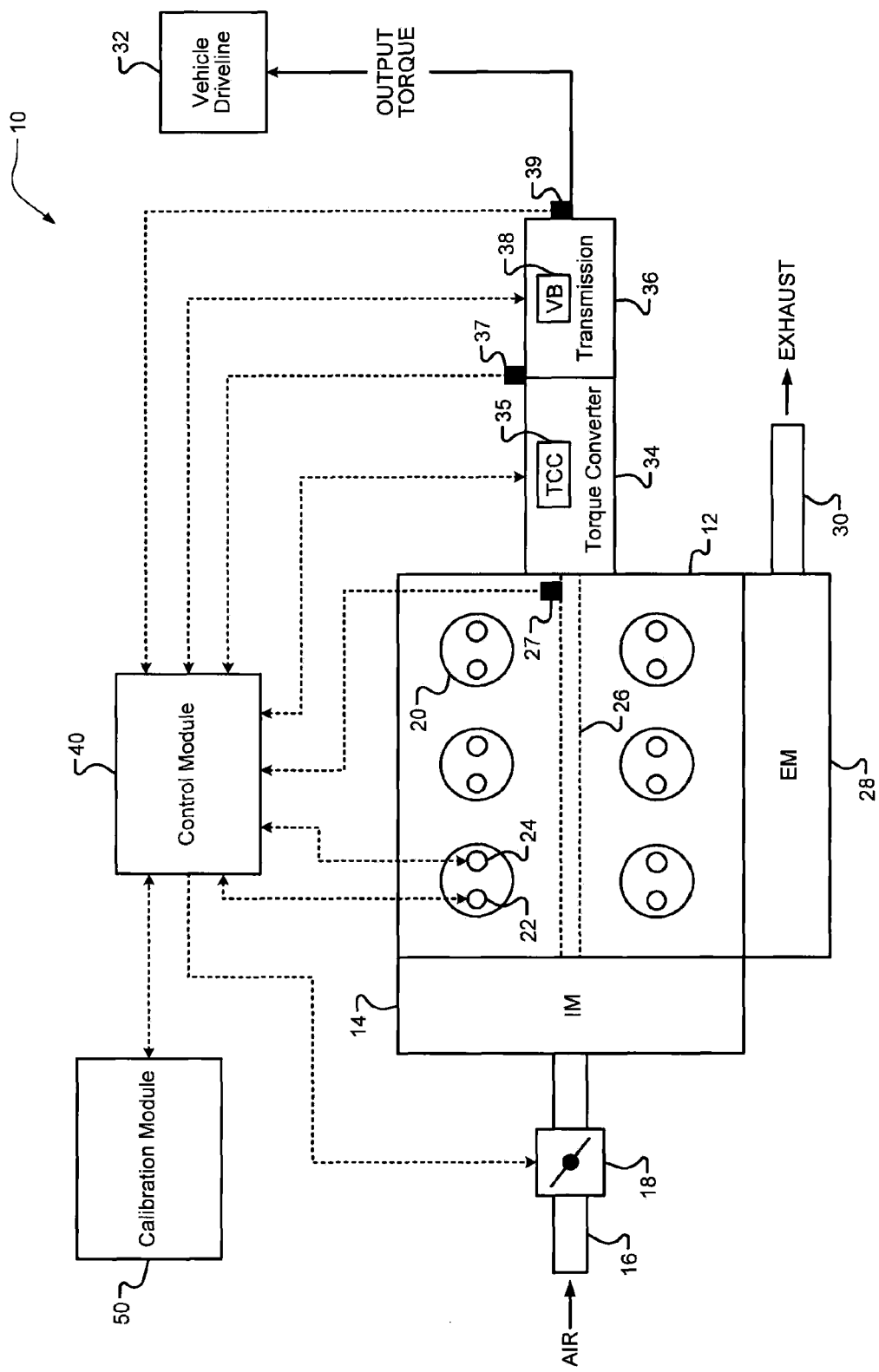
FIG. 1 is a functional block diagram of an exemplary powertrain system according to the present disclosure.

The following description is merely exemplary in nature and is in no way intended to limit the disclosure, its application, or uses. For purposes of clarity, the same reference numbers will be used in the drawings to identify similar elements. As used herein, the phrase at least one of A, B, and C should be construed to mean a logical (A or B or C), using a non-exclusive logical or. It should be understood that steps within a method may be executed in different order without altering the principles of the present disclosure.

As used herein, the term module refers to an Application Specific Integrated Circuit (ASIC), an electronic circuit, a processor (shared, dedicated, or group) and memory that execute one or more software or firmware programs, a combinational logic circuit, and/or other suitable components that provide the described functionality.

A torque converter allows a crankshaft of an engine to rotate at a different (e.g., higher) speed than an input shaft of a transmission. The torque converter may include a torque converter clutch (TCC) that is selectively applied to mechanically link the crankshaft of the engine with the input shaft of the transmission. In other words, the TCC draws torque from the engine when the speed of the input shaft of the transmission is lower than speed of the crankshaft. The torque converter and/or the transmission may be electronically controlled by a transmission control system.

Transmission control systems may include adaptive features. In other words, transmission control systems may modify operation of the torque converter and/or the transmission when a quality of a shift interchange is poor. For example, transmission control systems may include a learning feature that rapidly adjusts operation of the torque converter and/or the transmission after the vehicle has been placed on the road and is in service (i.e., after the vehicle comes off an assembly line). Specifically, a volume of the TCC may be unknown initially and thus may be learned. The unknown TCC volume, however, may result in increased noise/vibration/harshness (NVH) during shift interchanges due to inaccurate TCC pressure.

Accordingly, a system and method are presented for calibrating a transmission by determining a volume of a TCC. For example, the system and method may calibrate the transmission based on the determined volume of the TCC during vehicle assembly (e.g., on the assembly line). Specifically, the system and method may generate a transmission slip condition and then apply the TCC to generate transmission slip. For example, the transmission slip condition may include increasing idle engine speed to a predetermined idle speed, fully applying a first clutch of the transmission, and partially applying a second clutch of the transmission. The system and method may then determine a volume of the TCC based on a period for the TCC to fill with hydraulic fluid and a predetermined fill model. The system and method may also determine the volume of the TCC a plurality of times (i.e., cycles). The system and method may then generate a calibrated volume based on at least one of the determined volumes of the TCC and then calibrate the transmission based on the calibrated volume. For example, the system and method may calibrate an engine control module or a transmission control module (which may then store the calibrated volume and for use in future driving). For example only, the system and method may modify shift points and/or shift timing of the transmission.

Referring now to FIG. 1, a powertrain system 10 includes an engine 12. The engine 12 draws air into an intake manifold 14 through an inlet 16 that may be regulated by a throttle 18. The air in the intake manifold 14 may be distributed to a plurality of cylinders 20. While six cylinders are shown, the engine 12 may include other numbers of cylinders. The air distributed to the cylinders 20 may be mixed with fuel from a plurality of fuel injectors 22 to create an air/fuel (A/F) mixture. For example, the fuel injectors 22 may inject fuel into intake ports of the cylinders 20, respectively (i.e., port fuel injection). Alternatively, the fuel injectors 22 may inject fuel directly into the cylinders 20, respectively (i.e., direct fuel injection).

The A/F mixture in the cylinders 20 may be compressed by pistons (not shown) and ignited by spark from a plurality of spark plugs 24, respectively (i.e., spark ignition combustion). While a spark ignition direct injection (SIDI) engine is shown, other engines may be implemented. For example, the engine 12 may be a compression ignition (CI) engine (e.g., a diesel engine) or a homogeneous charge compression ignition (HCCI) engine. Additionally or alternatively, for example, the engine 12 may include port fuel injection.

The combustion of the A/F mixture in the cylinders 20 drives pistons (not shown) that rotatably turn a crankshaft 26 generating drive torque. A crankshaft speed sensor 27 measures a rotational speed of the crankshaft 26 (e.g., in revolutions per minute, or RPM). Exhaust gas resulting from combustion is expelled from the cylinders 20 through an exhaust manifold 28. The exhaust gas may be treated by an exhaust treatment system 30 to reduce emissions before being released into the atmosphere. The generated drive torque may be transferred from the crankshaft 26 to a vehicle driveline 32 (e.g., wheels) via a torque converter 34 and a transmission 36. In other words, the torque converter 34 may couple the crankshaft 26 to the transmission 36. For example, the torque converter 34 may include a hydraulic fluid coupling and the transmission 36 may include one of a hydraulic transmission and a dual dry clutch transmission (DCT). The transmission 36, however, may also be a different type of transmission.

The torque converter 34 may include a TCC 35. The TCC 35 may be selectively applied to mechanically link the crankshaft 26 of the engine 12 with an input shaft (not shown) of the transmission 36. A turbine speed sensor 37 may measure a rotational speed of a turbine (not shown) in the torque converter 34 (e.g., in RPM). For example, the rotational speed of the turbine (not shown) may equal the rotational speed of the input shaft (not shown) of the transmission. The transmission 36 may also include one or more planetary gear sets for achieving a desired gear ratio.

A valve body (VB) 38 in the transmission 36 may include a plurality of solenoid valves that control the flow of hydraulic fluid to actuate various components of the transmission 36. For example, the various components of the transmission 36 may include, but are not limited to clutches, servos, switches, etc. The transmission 36 may multiply the drive torque from the crankshaft 26 (via torque converter 34) by the desired gear ratio and output the multiplied drive torque to the vehicle driveline 32. A transmission output shaft speed (TOSS) sensor 39 may measure a rotational speed of an output shaft (not shown) of the transmission 36. For example, the measurement from the TOSS sensor 39 may indicate a speed of the vehicle.

A control module 40 controls operation of the powertrain system 10. While one control module 40 is shown, more than one control module may be implemented. For example, separate control modules may be implemented for powertrain (i.e., engine) control and transmission control, respectively. The control module 40 may control the throttle 18, the fuel injectors 22, the spark plugs 24, the torque converter 34 (including the TCC 35), the transmission 36 (including the valve body 38). The control module 40, however, may also communicate with other components of the powertrain system 10. For example, the control module 40 may receive signals from the crankshaft speed sensor 27, the turbine speed sensor 37 and the TOSS sensor 39. The control module 40, however, may also receive signals (i.e., measurements) from other sensors indicating various other powertrain operating parameters. The control module 40 may also implement the calibration system and/or method of the present disclosure.

A separate calibration module 50, however, may also be implemented to perform the calibration system and/or method of the present disclosure. For example, the calibration module 50 may be an external module located at the vehicle assembly line. While the calibration module 50 is shown to communicate to the powertrain system 10 via the control module 40, the calibration module 50 may also communicate directly to the various components of the powertrain system 10. Additionally, the calibration module 50 may be part of the control module 40.

Figure 2A:
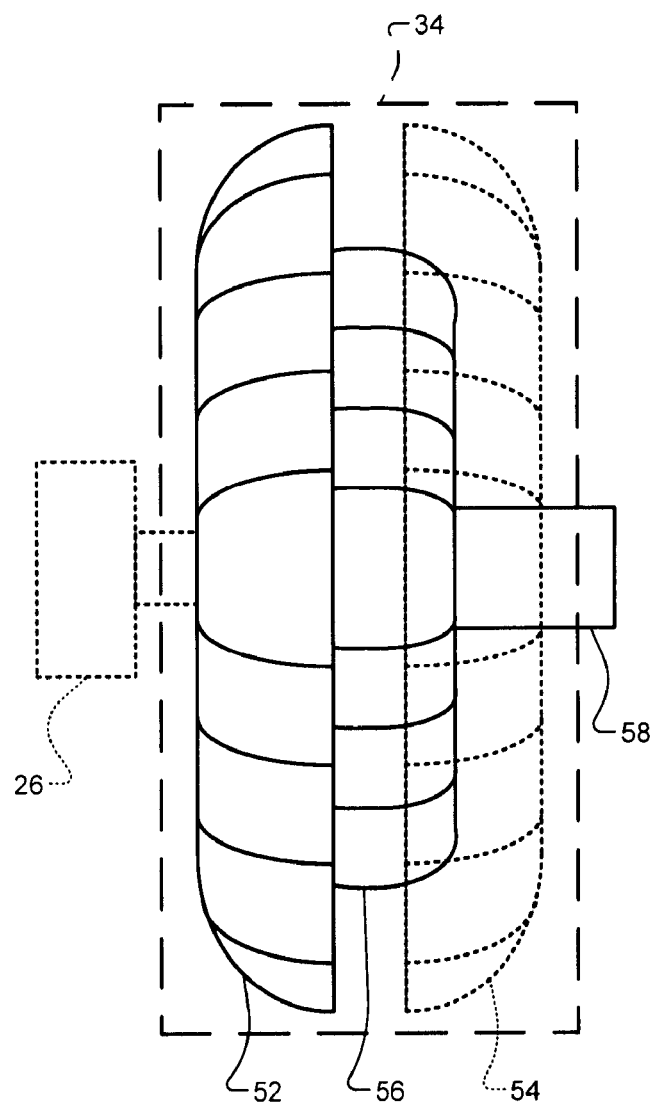
FIG. 2 is a schematic of an exemplary transmission according to the present disclosure.

Referring now to FIG. 2A, the torque converter 34 is shown in more detail. The torque converter 34 includes a turbine 52, a pump 54, and a stator 56. The pump 54 is linked to the crankshaft 26 of the engine 12, and thus rotates with the crankshaft 26 of the engine 12. The pump 54 includes blades or fins that direct transmission fluid within the torque converter 34 radially outward as the pump 54 turns. Directing fluid to the outside of the torque converter 34 creates a vacuum (i.e., low pressure with respect to the pressure near the outside) toward the center of the torque converter 34.

Similar to the pump 54, the turbine 52 also includes blades or fins. The blades of the turbine 52, however, direct the transmission fluid inward from the outside of the torque converter 34. The blades of the turbine 52 are arranged such that the transmission fluid flow through the turbine 52 rotatably drives the turbine 52. The turbine 52 is connected to and drives an input shaft 58 of the transmission 36. For example, the turbine speed sensor 37 may measure the rotational speed of the turbine 52 (e.g., in RPM).

Figure 2B:
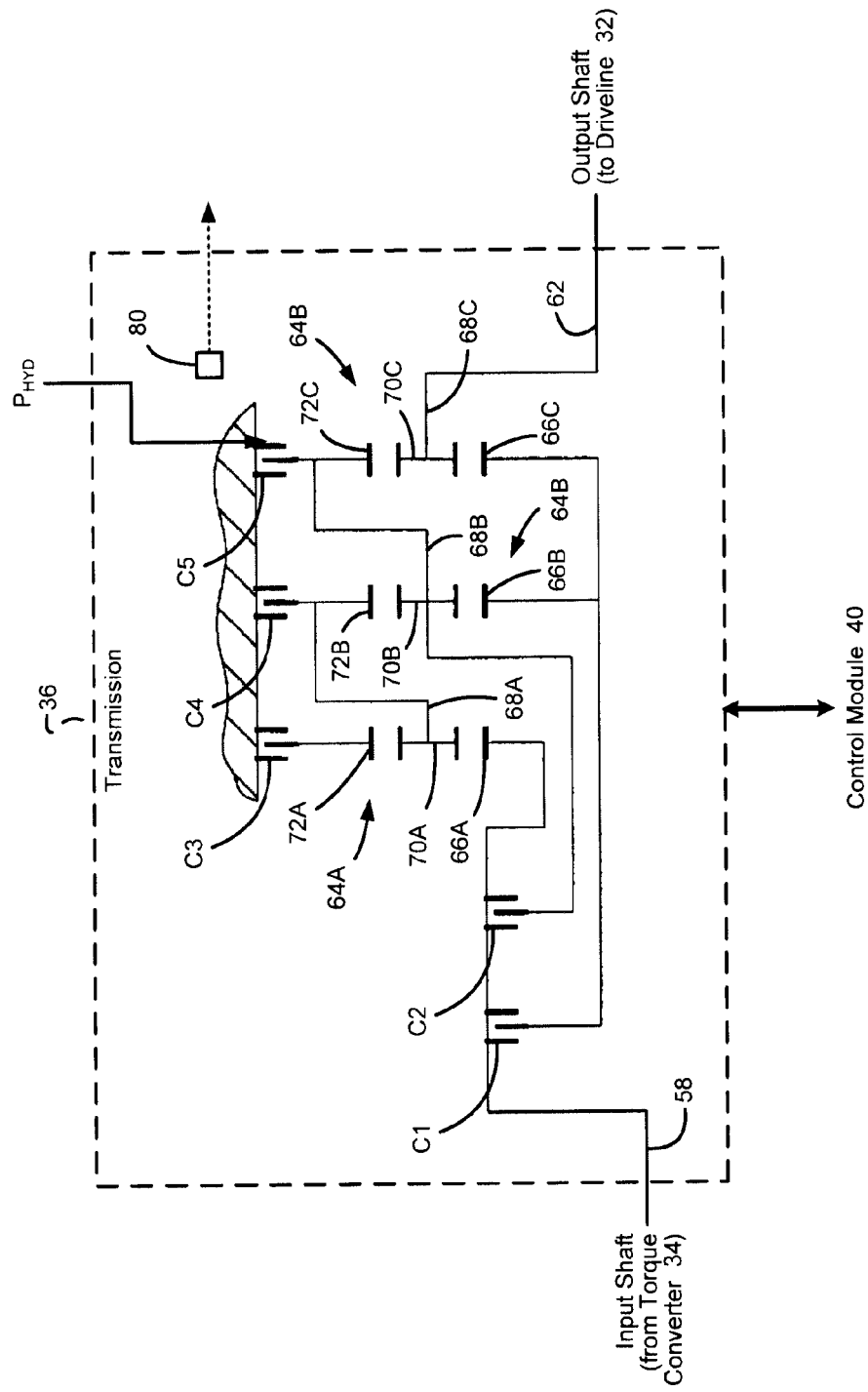

Referring now to FIG. 2B, the transmission 36 is shown in more detail. For example, the transmission 36 may be a six-speed automatic transmission as shown. However, it can be appreciated that various other transmissions may also be implemented, such as different types of transmissions and transmissions that include different numbers of gears. For example only, the transmission may be a dual clutch transmission. The transmission 36 may also communicate with the control module 40.

The transmission 36 includes the input shaft 58, an output shaft 62 and three interconnected planetary gear sets 64A, 64B and 64C, respectively. For example, the input shaft 58 may be driven by a turbine (not shown) of the torque converter 34. The planetary gear sets 64A, 64B, and 64C include respective sun gears 66A, 66B, and 66C, carriers 68A, 68B, and 68C, planetary gears 70A, 70B, and 70C and ring gears 72A, 72B, and 72C.

The transmission 36 further includes clutches C1-C5 that are selectively engaged to establish a desired gear ratio of the transmission 36. More specifically, the input shaft 58 continuously drives the sun gear 66A of the gear set 64A, selectively drives the sun gears 66B, 66C of the gear sets 64B, 64C via the clutch C1 and selectively drives the carrier 68B of the gear set 64B via the clutch C2. The ring gears 72A, 72B, and 72C of the gear sets 64A, 64B, and 64C are selectively grounded via the clutches C3, C4 and C5, respectively.

Hydraulic pressure ($P_{HYD}$) is selectively provided to the various clutches to regulate engagement of the clutches C1-C5. In other words, the pressure $P_{HYD}$ may allow the hydraulic fluid to flow through particular valves of the valve body 38 and engage corresponding clutches. A pressure switch 80 may be associated with the pressure line to each clutch and switches between ON and OFF states. More specifically, when $P_{HYD}$ is below a threshold pressure ($P_{THR}$), the switch is in the OFF state. When $P_{HYD}$ is greater than $P_{THR}$, the switch state is ON.

As diagrammed in Table 1 below, the state of the clutches C1-C5 (i.e., engaged or disengaged) may be controlled to provide six forward speed ratios (1, 2, 3, 4, 5, and 6), a reverse speed ratio (R), or a neutral condition (N).

TABLE 1

|  | C1 | C2 | C3 | C4 | C5 |
|---|---|---|---|---|---|
| $1^{st}$ | X |  |  |  | X |
| $2^{nd}$ | X |  |  | X |  |
| $3^{rd}$ | X |  | X |  |  |
| $4^{th}$ | X | X |  |  |  |
| $5^{th}$ |  | X | X |  |  |
| $6^{th}$ |  | X |  | X |  |
| R |  |  | X |  | X |
| N | X | X | X | X | X |

For example, the second forward speed ratio (i.e. $2^{nd}$ gear) is established when clutches C1 and C4 are engaged. Shifting from one speed forward speed ratio to another may generally be achieved by disengaging one clutch (i.e., the off-going clutch) while engaging another clutch (i.e., the on-coming clutch). For example, the transmission 36 may be downshifted from second gear to first gear by disengaging clutch C4 while engaging clutch C5. The neutral condition N may be commanded by engaging any one of the clutches C1-C5. Additionally, the neutral condition N may be commanded by engaging combinations of more than one of the clutches C1-C5. For example, engaging clutches C3 and C4 may generate a locked input condition that has a neutral output.

Figure 3:
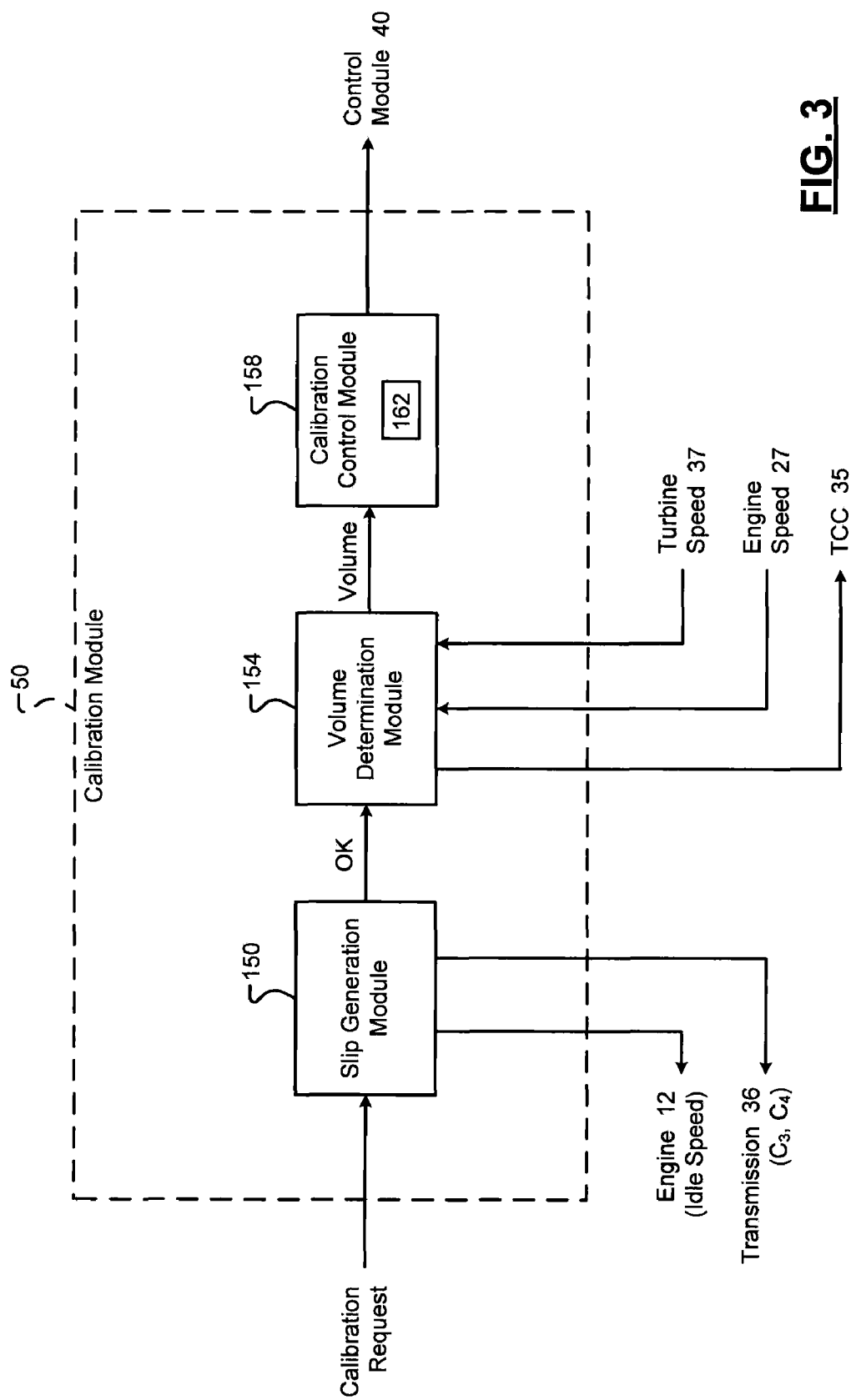
FIG. 3 is a functional block diagram of an exemplary calibration module according to the present disclosure.

Referring now to FIG. 3, the calibration module 50 is shown in more detail. As previously described, the calibration module 50 may be either an external module (e.g., located at the assembly line) or part of the control module 40. The calibration module 50 may include a slip generation module 150, a volume determination module 154, and a calibration control module 158. The slip generation module 150 may create a slip condition and generate slip at the transmission 36. Specifically, the slip generation module 150 may create the slip condition and generate the slip in response to a calibration request. For example, the calibration request may be received from an employee on the vehicle assembly line.

After receiving the calibration request, the slip generation module 150 may increase an idle speed of the engine (e.g., from 1000 RPM to 1200 RPM). Transmission slip, in other words, includes a difference between an input speed of the transmission 36 and an output speed of the transmission 36 (taking into account the gear ratio multiplier at the output of the transmission 36). The increased engine idle speed, therefore, may be more favorable for generating transmission slip. The slip generation module 150 may then generate the transmission slip by applying first and second clutches of the transmission (hereinafter referred to as $C_A$ and $C_B$, respectively).

Specifically, the slip generation module 150 may apply the first and second clutches $C_A$, $C_B$ to first and second predetermined levels, respectively. For example, $C_A$ may include clutch $C_4$ and $C_B$ may include clutch $C_3$ (see FIG. 2B). Additionally, for example, the first predetermined level may include full engagement of the first clutch $C_A$ (e.g., 100%). The second predetermined level may include partial engagement of the second clutch $C_B$ (e.g., 50%). The second predetermined level, however, may vary based on engine operating parameters (e.g., turbine speed). More specifically, the second predetermined level may correspond to a level of clutch engagement necessary to create a predetermined amount of slip (e.g., 200 RPM).

After the transmission slip is generated, the volume determination module 154 may apply the TCC 35 and determine the volume of the TCC 35. For example, the volume determination module 154 may receive a signal ("OK") from the slip generation module 150 as notification that the required transmission slip has been generated. The volume determination module 154 may apply the TCC 35 and determine a period for the TCC 35 to fill with hydraulic fluid. For example, the TCC 35 may be full of hydraulic fluid when turbine speed is within a predetermined threshold of engine speed. In other words, turbine speed may be less than engine speed after generating the transmission slip, but applying the TCC 35 gradually evens out engine speed and turbine speed, thus eliminating the transmission slip.

Therefore, the volume determination module 154 may measure the period starting when the transmission slip is generated and the TCC 35 is applied and ending when a difference between turbine speed and engine speed is less than a predetermined threshold. For example, the volume determination module 154 may include a timer that measures the period. The volume determination module 154 may then determine the volume of the TCC 35 based on the measured period and a predetermined fill model. For example, the predetermined fill model may compensate for various flow rates depending on a level of application of (i.e., pressure applied to) the TCC 35.

The calibration control module 158 receives the determined volume of the TCC 35 from the volume determination module 154. The calibration control module 158 generates a calibrated volume based on the determined volume of the TCC 35. As previously described, however, the volume determination module 154 may generate a plurality of determined volumes (e.g., one per cycle). Thus, the calibration control module 158 adjusts generates the calibrated volume and adjusts the calibrated volume based on the plurality of determined volumes. During a first cycle, however, the calibrated volume may include the determined volume (i.e., no previous stored data). The calibration control module 158 may then adjusts the calibrated volume by a predetermined percentage of the current determined volume (i.e., each cycle). For example, the plurality of calibrated volumes may be stored in memory 162. For example only, the memory 162 may include non-volatile (NV) memory.

The calibration control module 158 may then output the calibrated volume after the calibrated volume remains within a predetermined threshold (e.g., percentage) of a constant value. The calibration control module 158 then calibrates the control module 40 based on the calibrated volume of the TCC 35. More specifically, the calibration control module 158 calibrates (i.e., adjusts operation of) the transmission 36 via the control module 40. For example, the calibration control module 158 may modify shift points and/or shift timings of the transmission 36 that are stored in the control module 40. Additionally, for example, the control module 40 may store the determined volume of the TCC 35.

Figure 4A:
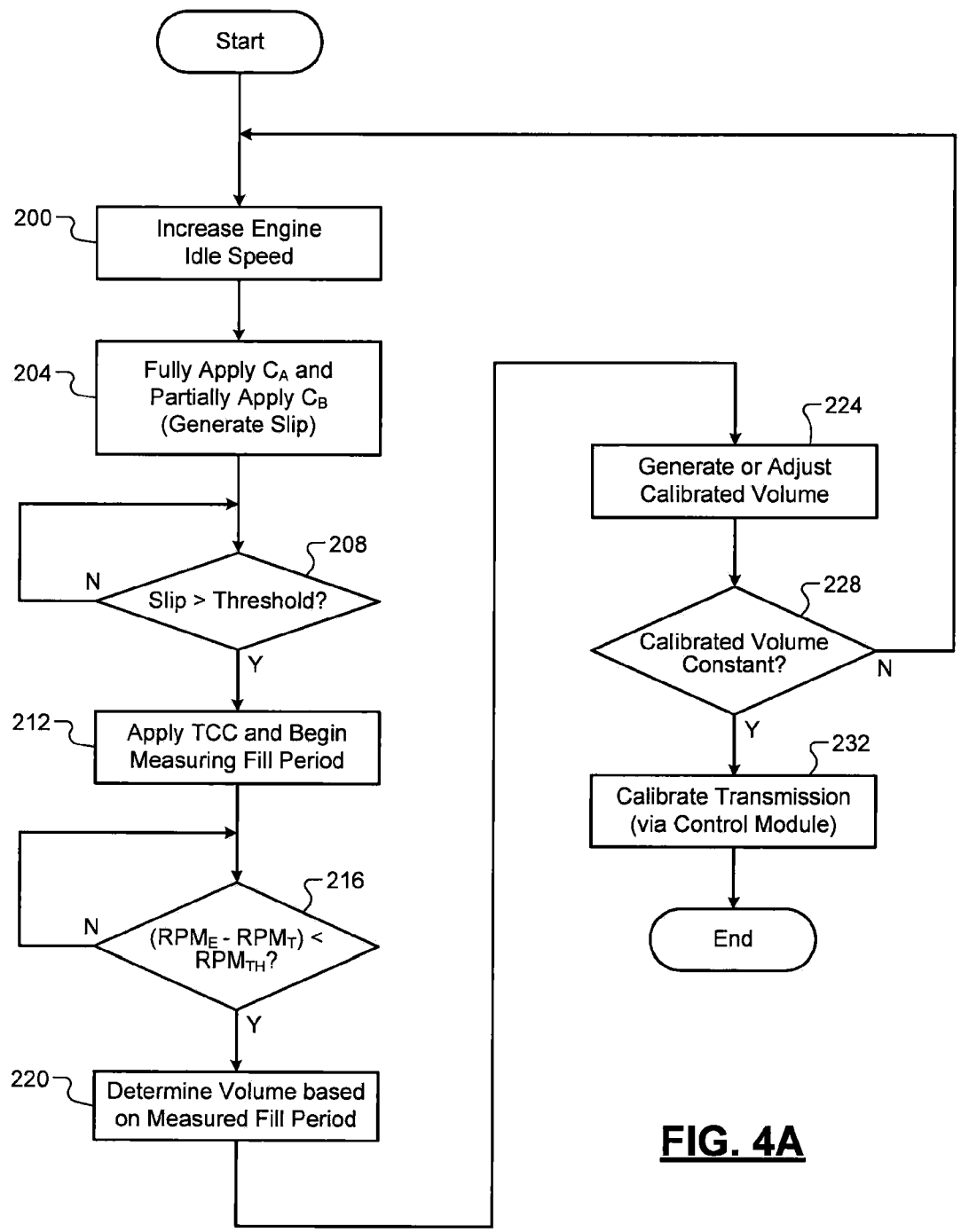
FIG. 4A is a flow diagram of an exemplary method for calibrating a transmission according to the present disclosure.

Referring now to FIG. 4A, a method for calibrating the transmission 36 begins at 200. At 200, the calibration module 50 increases engine idle speed to a predetermined engine speed. At 204, the calibration module 50 generates the transmission slip by applying the first and second clutches $C_A$ and $C_B$, respectively.

At 208, the calibration module 50 determines whether a desired amount of transmission slip has been generated. For example, the calibration module 50 may determine whether the amount of transmission slip is greater than a predetermined slip threshold. If true, control may proceed to 212. If false, control may return to 208. The calibration module 50, however, may also modify application of the second clutch $C_B$ (similar to 204) to increase transmission slip.

At 212, the calibration module 50 begins applying the TCC 35 and measuring the period for the TCC 35 to fill. For example, the calibration module 50 may start a timer to determine the period for the TCC 35 to fill. At 216, the calibration module 50 may determine whether a difference between engine speed ($RPM_E$) and turbine speed ($RPM_T$) is less than a predetermined speed threshold ($RPM_{TH}$). If true, control may proceed to 220. If false, control may return to 216.

At 220, the calibration module 50 may determine the volume of the TCC 35 based on the measured period for the TCC 35 to fill. For example, the calibration module 50 may stop the timer to determine the period for the TCC 35 to fill. At 224, the calibration module 50 may generate or adjust the calibrated volume of the TCC 35 based on a predetermined percentage of the determined volume of the TCC 35.

At 228, the calibration module 50 may determine whether the calibrated volume has remained within a predetermined percentage of constant for a predetermined period. If true, control may proceed to 232. If false, control may return to 200 where another cycle of determining the volume of the TCC 35 may begin. At 232, the calibration module 50 may calibrate the control module 40 based on the calibrated volume of the TCC 35. Control may then end.

Figure 4B:
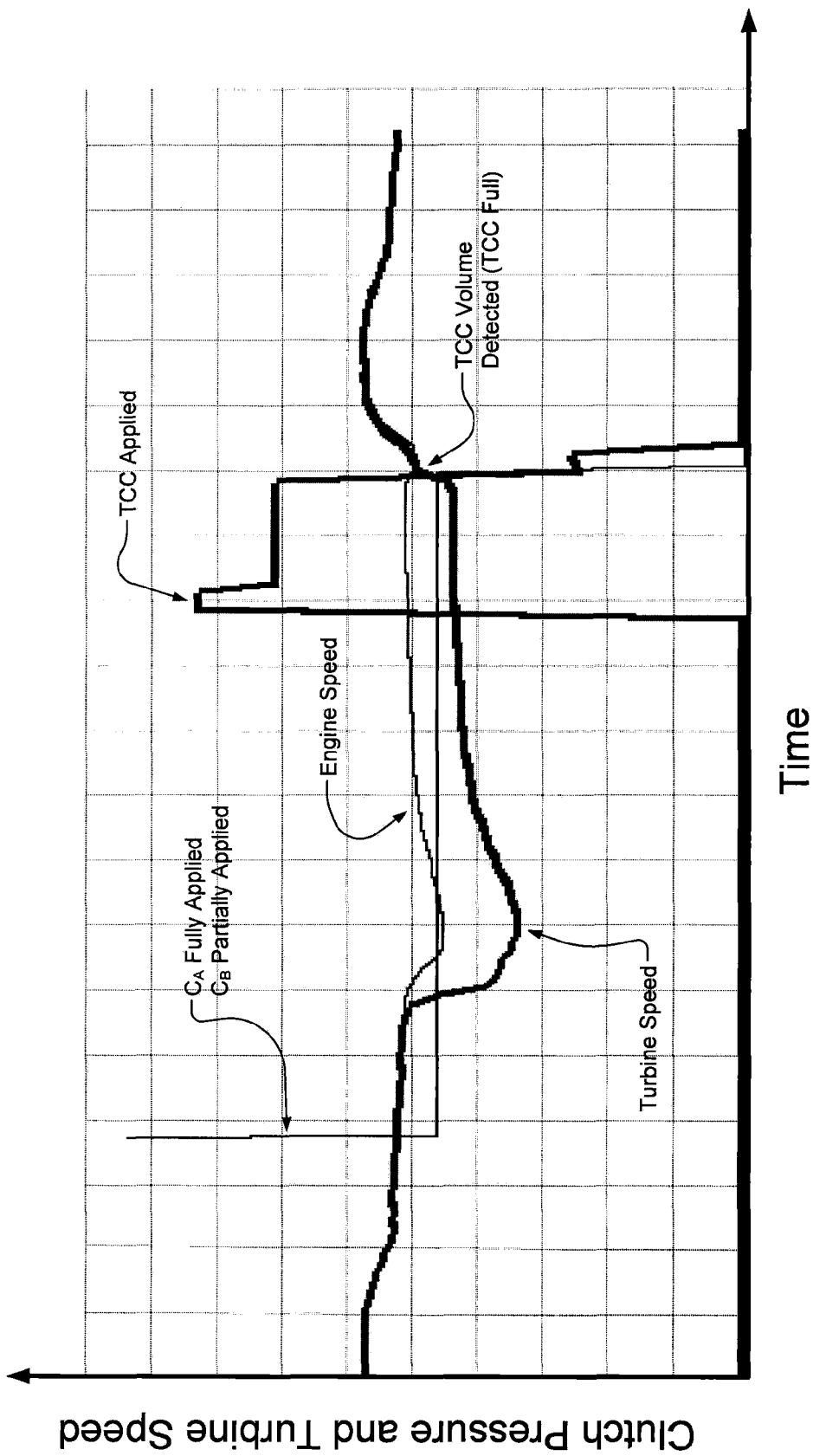
FIG. 4B is a graph illustrating various clutch pressures during the exemplary method of calibrating the transmission according to the present disclosure.

Referring now to FIG. 4B, a graph illustrates various clutch pressures of the transmission 36 during the calibration method of the present disclosure. More specifically, application of clutches $C_3$ and $C_4$ (see FIG. 2B) and the TCC 35 is shown during calibration (i.e., volume determination) of the TCC 35. First of all, engine speed has been increased to the predetermined engine idle speed that is more favorable for generating transmission slip. Next, clutches $C_4$ and $C_3$ are applied to the first and second predetermined levels, respectively, to generate the transmission slip. For example, the first predetermined level may be fully applied and the second predetermined level may be adjusted until a predetermined amount of transmission slip has been generated (e.g., 200 RPM). After the transmission slip has been generated, the TCC 35 is applied and a period to fill the TCC 35 is measured. For example, the TCC 35 may be full when a difference between engine speed and turbine speed is less than a predetermined speed threshold. After the TCC 35 is full, the measured period to fill the TCC 35 may be used to determine the volume of the TCC 35.

The broad teachings of the disclosure can be implemented in a variety of forms. Therefore, while this disclosure includes particular examples, the true scope of the disclosure should not be so limited since other modifications will become apparent to the skilled practitioner upon a study of the drawings, the specification, and the following claims.

What is claimed is:

1. A system for calibrating a transmission, comprising:
   a slip generation module that generates transmission slip;
   a volume determination module that, after the transmission slip has been generated, applies a torque converter clutch (TCC) and determines a volume of the TCC based on a period for the TCC to fill with hydraulic fluid; and
   a calibration control module that generates a calibrated volume based on the determined volume and calibrates a control module based on the calibrated volume, wherein the control module controls the transmission.

2. The system of claim 1, wherein the calibration control module modifies at least one of shift points and shift timing of the transmission via calibration of the control module, and wherein the control module stores the calibrated volume of the TCC.

3. The system of claim 1, wherein the slip generation module generates the transmission slip by increasing an idle speed of an engine and controlling clutches of the transmission.

4. The system of claim 3, wherein the slip generation module applies a first clutch of the transmission to a first predetermined level and applies a second clutch of the transmission to a second predetermined level, wherein the first predetermined level includes partial engagement, and wherein the second predetermined level includes full engagement.

5. The system of claim 4, wherein the first predetermined level is adjusted until the transmission slip is greater than a predetermined slip threshold.

6. The system of claim 1, wherein the period for the TCC to fill with hydraulic fluid begins when the TCC is applied and ends when a difference between engine speed and turbine speed is less than a predetermined speed threshold.

7. The system of claim 6, wherein the calibration control module one of generates and adjusts the calibrated volume based on the determined volume.

8. The system of claim 7, wherein the calibration control module adjusts the calibrated volume based on a predetermined percentage of a difference between the calibrated volume and the determined volume.

9. The system of claim 8, wherein the calibration control module calibrates the control module based on the calibrated volume when the calibrated volume has been within a predetermined percentage of constant for a predetermined period.

10. The system of claim 1, wherein the calibration control module calibrates the control module during vehicle assembly.

11. A method for calibrating a transmission, comprising:
    generating transmission slip;

after the transmission slip has been generated, applying a torque converter clutch (TCC) and determining a volume of the TCC based on a period for the TCC to fill with hydraulic fluid;

generating a calibrated volume based on the determined volume; and calibrating a control module based on the calibrated volume, wherein the control module controls the transmission.

12. The method of claim 11, wherein the calibrating the control module based on the calibrated volume includes modifying at least one of shift points and shift timing of the transmission and storing the calibrated volume of the TCC in the control module.

13. The method of claim 11, wherein the generating transmission slip includes increasing an idle speed of an engine and controlling clutches of the transmission.

14. The method of claim 13, wherein the controlling clutches of the transmission includes applying a first clutch of the transmission to a first predetermined level and applying a second clutch of the transmission to a second predetermined level, wherein the first predetermined level includes partial engagement, and wherein the second predetermined level includes full engagement.

15. The method of claim 14, further comprising adjusting the first predetermined level until the transmission slip is greater than a predetermined slip threshold.

16. The method of claim 11, wherein the period for the TCC to fill with hydraulic fluid begins when the TCC is applied and ends when a difference between engine speed and turbine speed is less than a predetermined speed threshold.

17. The method of claim 16, wherein the generating the calibrated volume includes one of generating and adjusting the calibrated volume based on the determined volume.

18. The method of claim 17, further comprising adjusting the calibrated volume based on a predetermined percentage of a difference between the calibrated volume and the determined volume.

19. The method of claim 18, further comprising calibrating the control module based on the calibrated volume when the calibrated volume has been within a predetermined percentage of constant for a predetermined period.

20. The method of claim 11, further comprising calibrating the control module during vehicle assembly.

* * * * *